(12) United States Patent
Slovik

(10) Patent No.: US 9,989,669 B2
(45) Date of Patent: Jun. 5, 2018

(54) INTERMODAL CONTAINER SCANNING

(71) Applicant: The United States of America, as Represented by the Secretary, Department of Homel, Washington, DC (US)

(72) Inventor: Gregory C. Slovik, Washington, DC (US)

(73) Assignee: The United States of America, as represented by the Secretary of Homeland Security, Washington, DC (US)

( * ) Notice: Subject to any disclaimer, the term of this patent is extended or adjusted under 35 U.S.C. 154(b) by 272 days.

(21) Appl. No.: 14/921,402

(22) Filed: Oct. 23, 2015

(65) Prior Publication Data

US 2017/0115427 A1 Apr. 27, 2017

(51) Int. Cl.
*G01N 23/04* (2018.01)
*G01V 5/00* (2006.01)

(52) U.S. Cl.
CPC .......... *G01V 5/0016* (2013.01); *G01V 5/0008* (2013.01)

(58) Field of Classification Search
CPC .................. G01V 5/0016; G01V 5/0008
See application file for complete search history.

(56) References Cited

U.S. PATENT DOCUMENTS

| 5,638,420 A * | 6/1997 | Armistead | B66C 19/007 378/146 |
| 2004/0258198 A1* | 12/2004 | Carver | G01N 23/04 378/57 |
| 2006/0257005 A1* | 11/2006 | Bergeron | G01N 23/04 382/103 |

OTHER PUBLICATIONS

Bennett et al., "100% Container Scanning: Security Policy Implications for Global Supply Chains", Thesis for Master of Engineering in Logistics, Massachusetts Institute of Technology, Jun. 2008.

* cited by examiner

*Primary Examiner* — Courtney Thomas
(74) *Attorney, Agent, or Firm* — Lavanya Ratnam; Trenton Roche; Nathan Grebasch

(57) ABSTRACT

The present disclosure relates to scanning intermodal containers and system and methods thereof. In particular, this disclosure relates to screening intermodal container without disconnecting it from a straddle carrier use to move them about a port or intermodal area. In embodiments, a system includes one or more scanners position on a side of a pair of track opposite a side used to support the straddle carrier. The respective tracks are spaced sufficiently apart so an intermodal container can be positioned (lowered) between the tracks to be passed by the scanners while it remains attached to the straddle carrier.

35 Claims, 4 Drawing Sheets

INTERMODAL CONTAINER SCANNING

GOVERNMENT RIGHTS

This invention was made with United States Government support. The Government has certain rights in this invention.

FIELD OF THE DISCLOSURE

This disclosure relates to screening intermodal containers.

BACKGROUND

Intermodal containers are an efficient way to transport large amounts of containerized cargo. Modern commerce relies on efficient transportation of intermodal containers. Due to the nature and transportability of intermodal containers, individuals may attempt to introduce items such as toxic chemicals, illegal or unauthorized substances such as narcotics, and radioactive/fissionable materials to avoid detection in transport.

There are two methods for screening intermodal containers, the Lay Down Method and the TraPack Method. The Lay Down Method uses a vehicle mounted scanner to screen containers and the Trapack Method involves positioning an intermodal container on a rail system to effectuate scanning. In the TraPack method, a straddle carrier sets the intermodal container on the rail system and picks it up again once scanning is complete. A straddle carrier is a vehicle with a frame structure having a lift mechanism capable of picking up an intermodal container. Most straddle carriers are powered by an internal combustion engine, e.g., a diesel engine but new hybrid units are now becoming available.

In the Lay Down Method, a straddle carrier lays down an intermodal container for screening. The container is screened by driving a truck with a scanner mounted on an arm past the container. The scanner evaluates the container's contents for radioactivity. Once complete, the straddle carrier picks up the container for further transport or storage.

In the TraPack Method a straddle carrier to picks up the intermodal container and places it on a rail type mechanism, e.g., a conveyor belt. The container is sent through a radiation scanner by moving it on the rails. After scanning, the rail mechanism moves it out of the scanner into a position for pick up by the straddle carrier for storage or transport.

SUMMARY

The present disclosure relates to scanning intermodal containers and system and methods thereof. In particular, this disclosure relates to screening intermodal container without disconnecting it from a straddle carrier while moving the container about to perform a scanning function to clear it as safe before it leaves the port or intermodal area. In embodiments, a system includes one or more scanners position on a side of the tracks opposite a side constructed to support the straddle carrier. The respective tracks are spaced sufficiently apart so an intermodal container can be positioned (lowered) between the tracks to be passed by the scanners while it remains attached to the straddle carrier.

BRIEF DESCRIPTION OF THE DRAWINGS

The same numbers are used throughout the drawings to reference like features.

FIG. 3 is a hybrid system in which tracks included in the system are above a surface of the surrounding area, but an included scanner is at least partially below a surface of the surrounding area.

DETAILED DESCRIPTION

Overview

Figure 1:
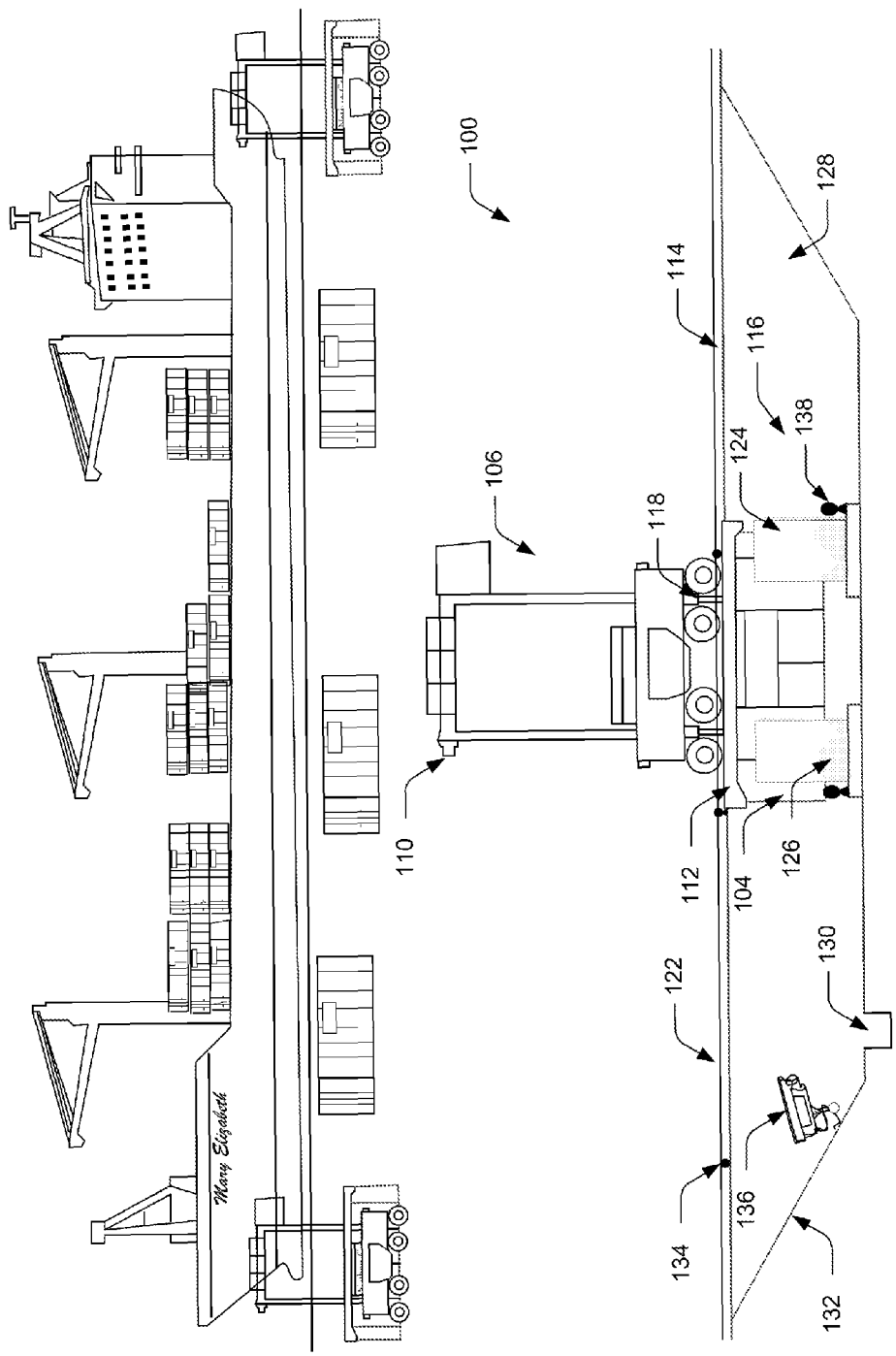
FIG. 1 is an illustration of example environment including a system in accordance with the present disclosure. As illustrated, the system is at least partially disposed in a pit or recessed area relative to the surrounding area.

Historically, goods were shipped in barrels, sacks, and wooden crates. Loading and unloading of ships was extremely slow and labor intensive which increased the risk of accident, loss, and theft. As a result, containers were created to hold goods of various shapes and sizes, while permitting efficient transport.

Intermodal containers became a standard of modern cargo transportation in the 1950s. Intermodal containers are rectangular shape with one side typically having two hinged doors. These containers usually come in two sizes, 20 feet and 40 feet which allow for variation and efficient transport. Those of skill in the art will appreciate that intermodal containers can have different designs while providing unitized or consolidated storage and shipping of goods, these too can be scanned using the system, techniques, approaches, and methods of the present disclosure. Examples of other intermodal container designs are suitable for transporting liquids, gases, bulk materials (metals, grains, minerals), and so forth. For example, an intermodal container for hauling bulk material may have a trap-door type door that permits grains to flow out of an intermodal container having a sloped side. An intermodal container for gases or liquids may have a box-shaped frame structure that surrounds a central tank. Although intermodal containers come in various dimensions, they typically are sized to be transported efficiently by vehicles such as ships, trains, and trucks.

Intermodal containers are typically filled by the manufacturer, sealed, and then transported via rail or truck to a port for ocean transport. Upon arrival at the destination, the process is reversed and the intermodal container is delivered to the end user who unloads it.

In the following description, reference is made to the accompanying drawings which illustrate embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention defined is only by the accompanying claims.

Referring to FIG. 1A, an environment 100 including a system 102 in accordance with the present disclosure is illustrated. As shown, the system 102 is operable to screen an intermodal container 104 without disconnecting the intermodal container from a straddle carrier 106 used to transport the container to various locations about a port. As part of unloading a cargo ship, a ship configured to carry intermodal containers, a gantry crane may deposit a container on the dock to be collected by a straddle carrier, which may transfer it within the port to be loaded on a truck or train or for temporary storage within the port.

A straddle carrier 106 is a vehicle with a frame structure configured to support a hoist mechanism that is constructed to pick up an intermodal container 104. For example, a straddle carrier 106 is a generally rectangular frame structure supported by four steel column corners to vertically lift the intermodal container from the ground to many feet into the air within straddle frame. The hoist mechanism 110 supports a lift frame 112 that is designed to engage with the intermodal container 104 by using arms positioned adjacent to the corners of a received intermodal container (e.g., at the corners) to grasp the container, such as via twist locks. In some examples, the straddle carrier 106 engages or locks in the intermodal container 104 by inserting twist locks into corresponding receptacles positioned at the corners of an intermodal container. In this way, the straddle carrier 106 can lift the intermodal container 104 off the ground or other surface to transport it to, for example, an awaiting train or truck or to place it in a location for storage. Although straddle carriers are efficient, it does take time for a straddle carrier to connect/disconnect an intermodal container this is in addition to any dead-head time consumed by driving the straddle carrier without an intermodal container. This is very inefficient as even a small container ship may have three thousand intermodal containers on board, so time and efficiency of port operations is of particular importance. Moreover, straddle carriers consume large amounts of energy (diesel fuel) and are typically manned by highly compensated professionals. Moreover, straddle carriers can be outfitted with arm extensions that permit the straddle carrier to position (e.g., lower) an attached intermodal carrier below the straddle carrier (e.g., below its tires), presuming there is a void in the support surface that permit it to do so.

One source of inefficiency in shipping intermodal containers and in particular in port operations is screening intermodal containers. Although port operations are discussed throughout this disclosure, the principles of the present disclosure can be applied to a wide variety of container screening scenarios, rail-hubs, trucking centers, ports of entry, and so forth. Screening intermodal containers is extremely important in part due to their ubiquitous nature and importance in commerce, both intranationally, and internationally. While very efficient, the design and use of intermodal containers makes them susceptible for transporting illegal items, goods, such as drugs (e.g., illegal narcotics or other unauthorized drugs), illegal currency, weapons, radioactive material, improvised nuclear devices, and so forth that is unlawful and/or dangerous. These items may be introduced by opening up the container door or by cutting a side of the container and then re-securing the removed portion. An example of the latter, is a criminal cutting a side of an intermodal container to insert radioactive material into the container and then welding the metal forming the wall of the intermodal container closed.

It is very important, in particular, that intermodal containers are screened for such items to protect homeland security, stop or limit the trafficking of illegal goods and thwart the plans of terrorists, criminals, rouge nations, and others that would do us harm. While important for security concerns, inefficiency in screening intermodal containers can hinder international commerce, delay the movement of cargo ships, reduce the port's overall energy efficiency, and perhaps lead to changes in port-of-call visits. The decision of which port to visit by a cargo ship, especially mega container ships, is very competitive. Even slight delays and inefficiencies accumulate and have large monetary and time consequences. Accordingly, systems, methods, approaches, and techniques will now be discussed that can permit screening of intermodal containers.

As illustrated, a system 102 of the present disclosure includes a pair of tracks 114 (one is referenced) that are spaced apart so that an intermodal container 104 can pass between the tracks and one or more scanners 116 for screening the intermodal container. For example, the respective tracks are spaced sufficiently apart so an intermodal container 104 and support arms 118 on a straddle carrier 106 can pass between the tracks for scanning. In embodiments, the tracks are spaced apart approximately 8 (eight) feet from inside of track to the inside of the other track. It will be appreciated that the distance between the pair of tracks and the widths of the respective tracks may be sufficiently large to accommodate straddle carriers of various sizes, e.g., straddle carriers of different widths or hoists of different sizes. It should be apparent that one side of respective tracks 114 can be bounded (e.g., a side adjacent where an intermodal container is configured to pass), while the other side is unbounded. In other embodiments, the tracks are constructed to support a straddle carrier 106 so it can position an intermodal container 104 on an opposite side of the tracks 114, e.g., below or generally below the tracks to scan the container.

As illustrated, the tracks 114 are formed by concrete. In operation, a straddle carrier 106 drives up to the tracks, lowers the container 104 for scanning, the container is scanned, the straddle carrier raises the container so it is above the portion of the straddle carrier's that contacts the support surface (e.g., bottom of the tires), and drives off for disposition of the intermodal container. In embodiments, the raising/lowering of the intermodal container is performed while the straddle carrier 106 is in motion, although fixed position raising and lowering can also be performed. Other materials with sufficient strength to support the straddle carrier, such as the straddle carrier loaded with an intermodal carrier can be used as well, e.g., steel. For example, the tracks are formed of metal such as in a bridge or trestle design (generally observable in FIGS. 2 and 3) if the system is to be portable and/or be above the level of the adjacent ground/support surface (e.g., concrete area 120) such as if the water table is near the support surface. In embodiments, a surface treatment, e.g., ridges, is included on the straddle carrier side of the tracks. This may be done to aid traction, in particular if the tracks are at least partially sloped as will be discussed later in this document. For example, ridges or another pattern of ridges, grooves, or perforations are included to aid traction and/or divert water such as rain, sleet or snow. In another example, the material forming the tracks defines perforations that permit rain, sleet, snow to pass through.

In some embodiments, a track includes one or more curbs 122. Curbs can be formed from a variety of materials such as concrete or metal. In instances where the tracks are concrete, the curbs may be concrete as well. Metal (e.g., steel) can be used as well. For example, the curb 122 is formed as a rail or tube that is supported by stanchions placed periodically along its length.

In embodiments, the respective track's length is one or more of in the range of eighty (80) to one hundred twenty (120) feet, approximately eighty (80) feet long, approximately one hundred twenty (120) feet long, substantially eighty (80) feet long, substantially one hundred twenty (120)

feet long feet long. In embodiments, the track length is based on one or more of the following criterion: scanner or detector operating parameters, actual or anticipated intermodal container dimensions, straddle carrier operating parameters (actual, anticipated, average, median), a predetermined criterion (e.g., threat level), and combinations thereof. For example, the length of the track is determined based on the speed at which a straddle carrier 106 can position (e.g., lower/raise) an intermodal container 104 into a path of a scanner included in the system, a speed at which scanners operate (both individually and collectively), and so on.

The height of the curb 122 above the straddle carrier support side of the track can be selected to prevent the straddle carrier 106 from moving laterally off the track, e.g., sliding or rolling off a side of the track. For example, the curb's height extends between 1 (one) foot to 18 (eighteen) inches, approximately 1 (one) foot, approximately 18 (eighteen) inches from the tracks support surface. In some instances, the curb height is selected based on the dimensions for a range of tires/wheels for commercially available straddle carriers. For example, the curb is one quarter the height, approximately one quarter the height, half the height, or approximately half the height of a straddle carrier tire between its outer surface and a tire rim. Those of skill will appreciate that the curb can be sized for a range of tires or for an average or median tire size or anticipated tire size or to accomplish a particular purpose, e.g., be of sufficient height to force a straddle carrier into alignment with the tracks.

Optionally, a curb is flared outwardly on an end to aid alignment of the straddle carrier 106 with the tracks and as a result one or more scanners 116 included in the system. In embodiments such as this, an end of the curb angles outwardly from the track (e.g., away from a center line of the track along its length) so a straddle carrier's tire is directed toward the track, such as a side of the straddle carrier's tire contacting the curb. For example, the interior sides of the respective tracks include curbs' with flared ends. The foregoing can be done on an end of the track to which the straddle carrier is to drive prior to scanning.

As illustrated, the system includes two scanners, a radiation a Non-Intrusive Inspection (NII) detector 124 (e.g., an x-ray detector or an active scanning detector) and/or a Radiation Portal Monitoring (RPM) detector 126 (e.g., a passive radiation detector). As illustrated, the scanners are on a side of the tracks opposite the side for supporting the straddle carrier. In embodiments, the scanners are configured to detect a property associated with an intermodal container as it passes by, e.g., an item contained in the intermodal container. While movement of an intermodal container will be discussed throughout, it is to be apparent that the scanners can be configured to move while the container remains in place or both can move relative to one another. This may be done to classify the intermodal container based on a predetermined criteria, e.g., radiation level, presence of a prohibited item or an item of interest, and the like. Example properties include, but are not limited to, a radiation energy level or total count, radiation type (i.e., gamma or neutron), presence of an item, such as a weapon, narcotics, drugs, currency, prohibited items, toxic chemicals, illegal substances, and so forth. This may be done without disconnecting the intermodal container 104 from the straddle carrier 106.

In embodiments, the scanner is positioned below the tracks. For example, the NiI and RPM are located in a pit, recess, or ditch that is lined with concrete and may be on a side opposite a side of the tracks constructed to support a straddle carrier/a side on which a straddle carrier is to drive. In the illustrated embodiment the scanner is generally below the surface of the adjacent area. For example, gunnite or concrete (created with low amounts of naturally occurring radiation material to increase detector sensitivity) is used to form the pit 128, e.g., walls of the pit.

The floor of the pit may be sloped or at least partially sloped to aid in draining any water that may enter the pit. In further embodiments, a sump 130 and/or a drain is included to aid in draining rain. In embodiments, the height of the pit from floor to top of tracks is 10 (ten) feet, approximately 10 (ten) feet, or substantially 10 (ten) feet. Although the pit is illustrated with sloped end walls 132, in other embodiments the end walls are vertical or substantially vertical. The pit 128 and/or its end walls can be sized so the straddle carrier can lower/raise the intermodal container as it is in motion, e.g., moving towards the scanner in the case of lowering, raising in the case of moving away from scanners after the intermodal container has been scanned. For example, the end walls and/or the floor of the pit is sloped so an intermodal container 104 can be lowered as the straddle carrier 106 moves along the tracks, e.g., the straddle carrier and/or pit and scanner are designed so the intermodal container can be lowered as the straddle carrier drives on the track and the intermodal container is in proper position (e.g., vertical position) for scanning relative to the included scanner. In embodiments, the length of the pit, position of the scanner, slope of the end walls are configured so the straddle carrier can lower the intermodal container for scanning and raise it after scanning as it moves along the tracks at 5 (five) miles per hour, substantially 5 (five) miles per hour, approximately 5 (five) miles per hour. While 5 (five) miles per hour is contemplated, those of skill in the art that the length of the pit, position of the scanner (both depth and distance along the pit) can be configured base on operating parameters of a particular straddle carrier (e.g., speed at which the hoist operates), an average of straddle carrier operating parameters, or median operating parameters for a group of straddle carrier, e.g., the median or average of straddle carriers at a particular port that is to include the system. Other factors may be considered as well these include, but are not limited to, operating parameters of a scanner, weather, content or anticipated content of an intermodal container, and so on.

In some embodiments, shielding material is also included in the pit to minimize background radiation for the RPM and/or to shield the external environment from energy generated by scanners, e.g., non-intrusive inspection or x-ray detectors, and so forth. In these embodiments, steel plates are positioned between the RPM and the walls of the pit, e.g., side walls relative to the tracks primary length. This may limit background radiation detected by the RPM 126 during scanning and/or shield the environment from scanner energy. While background radiation may be minimized, it should be apparent that embodiments exist in which a scanner obtains a background scan (e.g., a standard) and uses it to normalize a scan from inspecting an intermodal container.

The RPM 126 and NII 124 detectors are positioned so that an intermodal container 104 can be passed by as the straddle carrier 106, loaded with the container, passes by the detector when scanning. In this scenario, the intermodal container 104 is positioned on the side of the tracks opposite the side constructed to support the straddle carrier 106. As illustrated in FIG. 1, the scanners are below the tracks when viewed with the "FIG. 1" caption at the bottom of the drawing. Positioning the scanners opposite the side of the tracks that support the straddle carrier 106 permits scanning of the intermodal container 104 without disconnecting or unloading it from the intermodal container. This not only eliminates the straddle carrier having to disconnect and reconnect the intermodal container, but it eliminates deadhead runs associated with scanning intermodal containers.

In some embodiments, a switch is included in the system 102 to cause the scanner 116 and/or other devices or subsystems to operate. For example, a pressure switch 134 is included on the tracks to initiate the scanning and or other process. An example of the latter is capturing data such as a unique identifier or identifier that is visually observable on an outer surface of the container. In the previous example, the pressure trigger 134 is position so a straddle carrier driving on the track depresses the switch, which is communicatively coupled to the included scanner and/or other devices, when a tire rolls over the trigger, a scanner is activated and begins upon the switch actuating or at a predetermined time, e.g., 20 seconds after triggering, and the like.

It should be appreciated, that multiple switches may be included in the system 102 for a variety of purposes. For example, a first switch is functional to cause a scanner to enter operational mode while a second switch triggers scanning. An additional switch may be included and positioned so the scanner enters standby mode and/or turns off as the intermodal container or straddle carrier exits one or more of the scanner or the tracks. In other embodiments, one switch triggers a first scanner and a second switch triggers a second scanning device. Other switches may be included in additional embodiments, for example a camera such as a video or still camera may be used to detect the presence of an intermodal container so an unloaded straddle carrier does not trigger the scanner. In still other embodiments, RFID technology is used to signal the presence of a straddle carrier and/or intermodal container and trigger the system as well as to record the container identification for the any connected database to record its inspection history or site information.

In still other embodiments, a single switch actuates more than one scanner, device, or subsystem, but the switch or a controller to which the switch is communicatively coupled implements a time delay. Those of skill in the art will appreciated that a controller may execute a program of commands that are operable to cause one or more of the component in the system 102 to function in a preprogrammed way, e.g., follow a program of instructions that causes components to operate in a predetermined manner. While the predetermined manner may be the same or substantially the same for each operation, in other instances it can vary depending on one or more factors or criterion, e.g., anticipated content of an intermodal container. For example, upon activation of the pressure switch 134, a RPM detector 126 operates for a predetermined period of time before an included NH detector 124 operates for a period of time. If more than one scanner 116 is included in the system the individual detectors can operate in a "blinking" fashion, e.g., one operates while the other is on standby or off, and vice versa. For example, the scanners are configured so the RPM 126 turns on to scan at least a portion of the intermodal container 104 (e.g., front half of the container), turns off to permit the NII 124 to scan the first half before the process is repeated for the back half of the intermodal container. The scanners may be positioned along the tracks to promote effective scanning, e.g., a RPM and Nil are positioned apart so the scanners can effectively scan the intermodal container as it passes by the scanners. The scanners must be operated separately so energy from one scanner does not affect the other. This may be done for a variety of reasons, one example of which is that use of an Nil detector 124 may interfere with operation of the RPM 126.

All or one or more of these may be of the same type or similar types. While other devices or subsystems can be triggered by the switch, in other instances switches are included for this purpose. For example, a still picture or video camera 136 is triggered by the pressure switch 134 to capture an image of the container 104 or a portion thereof, e.g., a visible identifier (bar code), Convention for Safe Container (CSC) data, Bureau International des Container (BIC) data, a container number, or the like that is associated with the container, for example in this case connected, painted on or affixed to an outer surface of the container. In embodiments, system components are used for different or multiple purposes, e.g., a camera 134 is used as a presence switch and to capture data from a unique identifier.

Other suitable switches include, but are not limited to, beam type switches 138 (one is referenced) such as infrared or laser based switches, proximity detector type switches, electromagnetic detectors switches, and the like that are operable to trigger electromechanical devices such as the RPM and NII detectors 126, 124, or other devices or subsystems. In embodiments, more than one switch may be used, e.g., a pressure switch and a beam interrupt switch both have to be actuated for operation to occur, the switches are respectively responsive to actuation by a tire included on the straddle carrier and an intermodal container being positioned so it will interrupt a beam.

In embodiments, the system 102 is operable to obtain data that represents a unique identifier that is physically associated with the intermodal container. For example, the system is operable to obtain data for a visual identifier on intermodal containers so it can be associated with data obtained from the scanner. In another example, data from the visual identifier is related to scan data in a relational database and/or the visual identifier data is included as metadata to the scan data or a portion of the scan data, e.g., a scan image. In embodiments, the visual identifiers is data from the Bureau International des Containers code, the Convention for Safe Containers plate, data from a Radio-frequency Identification Tag/chip, or a combination thereof. A wide variety of detection mechanisms may be included in the system to effectuate this capability.

Example detection mechanisms include, but are not limited to, a camera (e.g., a video 136 or still camera), a bar code reader/laser, a RFID reader/transceiver, a camera that operates in a non-visible portion of the electromagnetic spectrum, and the like for obtaining unique identifier data. In some embodiments, a detection mechanism can provide additional functionality. For example, in addition to providing unique identifier data, a RFID tag may also function or otherwise indicate whether the intermodal container has been opened. In this example, the RFID tag acts as a seal for a door on the intermodal container. For example, a loop that forms an electrical connection on an RFID tag is secured through a latch that secures the door, in this way an individual cannot gain entry through the door without breaking the electrical connection, which in-turn can be identified by an RFID reader due to its non-response or a response that indicates the RFID tag has violated.

In further examples, a video camera, in addition to capturing unique identifier data, can also inspect the side walls of an intermodal carrier to detect whether a portion of the side wall has been removed and reattached to gain entry into the container, such as to place illegal drugs into the container. For example, in addition to triggering a RPM 126 and NII 124, one or more video cameras included in the system triggers an included camera to record the intermodal container as it is scanned. A camera, whether still or a video, can be used by the system 102 to perform other tasks. As illustrated, the system includes a camera at the base of the tracks (adjacent to where a straddle carrier is to drive on the tracks) in order to record the visual identifiers. The camera, in this embodiment, records the Bureau International des Containers code and the Convention for Safe Containers plate to verify the data associated with the intermodal container.

The camera can also record if a seal on a latch of the intermodal container 104 is in place. Lack of a seal is indicative of tampering with the container 104. For example, a controller, e.g., a computer system with shape recognition software, uses an image of an intermodal container's doors to determine whether a mechanical seal (e.g., a lead seal) is in place. If the seal is in place, it is indicative of the intermodal container having not been tampered with, e.g., the latch has not be opened since the container was sealed.

In some embodiments a system includes multiple cameras or other detection mechanisms to capture images of all or substantially all of the sides of a container. While computer based recognition technology (e.g., shape recognition technology) can be used to detect whether unauthorized entry has been made, in other embodiments, data from such detection mechanisms can be communicated to a remote location for monitoring, such as by a U.S. Customs and Border Protection Officer who is monitoring scanning by multiple systems, which may be at different locations.

The Bureau International des Containers code uses five identification codes on the back right door of the intermodal container. This may include the owner code, the product group code, the registration number, the check digit, and the size and type code. The codes abide by the International Organization for Standardization standards. The Convention for Safe Containers plate is located on the left door of the intermodal container. It displays the Convention for Safe Containers approval number and includes details about the intermodal containers. The details may include a date of manufacture, an identification number, a maximum gross weight, an allowable stack weight, a racking test load value, and end wall strength. The plate may also include an identifier for the Approved Continuous Examination Program, a country code where the approval for the program was granted, the year of approval, and the Approved Continuous Examination Program number.

Another identifier may be a radio-frequency identification tag including a chip. A radio-frequency identification chip uses radio-frequency electromagnetic fields to transfer data. The chip may be placed anywhere on or in the intermodal container. An RFID tag allows for the intermodal container to be scanned from a distance and electronically send the data associated with the intermodal container to a recipient.

In embodiments, the system includes a Radio-frequency Identification receiver/transmitter located near the camera at the base of the tracks in order to receive and transmit data associated with the intermodal container. Data may include, but is not limited to contact information of a manufacturer, contents of the intermodal container, and contact information of the purchaser.

The camera and radio-frequency identification receiver/transmitter can be positioned so that a straddle carrier loaded with an intermodal container can pass by them for recording and receiving/transmitting. In this scenario, the straddle carrier drives into the outwardly flared curb to align with the track. Once the straddle carrier has pulled on the track (e.g., the back tires are through the outwardly flared curb), the camera and receiver/transmitter will record and transmit the data associated with the intermodal container. This allows for tracking as the intermodal container travels from manufacturer to end user.

In embodiments, the system includes a reporting system that is constructed to report an outcome of a classification according to a predetermined criteria, e.g., is an illegal item present, a radiation level exceeded. In some embodiments, a reporting system includes a visual indicator such as display sign. A display sign may be configured like a red-green stoplight or may be a digital display board configured to provide instructions, e.g., a light emitting diode (LED) board capable of displaying message, "take to area A." In other embodiments, a wireless transmitter or transceiver is included to communicate information (e.g., an outcome of the classification) such as to an operator of a straddle carrier. This can be done audibly (voice instructions) and/or visually, such as on a digital display in the cab of the intermodal container. The foregoing reporting system can be used for other purposes as well, such as to communicate alignment information determined by a camera or other detector, or other instructions, e.g., slow down. The foregoing may be included in addition to other communications system, whether physically or wirelessly connected. An example of another communication system is a communication system that communicates with a screening authority like U.S. CBP.

In some embodiments, the system 102 is configured so it can be protected or temporarily covered over. For example, the pit 128 may be configured so metal plates can be used to cover the pit when it is not in use. For example, rather than being an obstacle when a ship is being loaded/unloaded and scanning is to occur, the pit is covered with plates that permit straddle carriers and other vehicles to pass over it. In some embodiments, components that extend beyond the tracks and/or the height or general height of a surrounding surface are constructed to retract or be removable. For example, the curb stanchions fit into corresponding holes or recesses defined by the track and/or included support structures for holding the curb in place. In other instances, curb stanchions are pivotally mounted to the pit so they can be pivoted out of the way when the system is not in use. In some instances, mechanisms for securing plates placed over the pit are included. Example mechanisms include, a retaining lip, a pin and corresponding void, clip mechanisms, and so forth.

Figure 2:
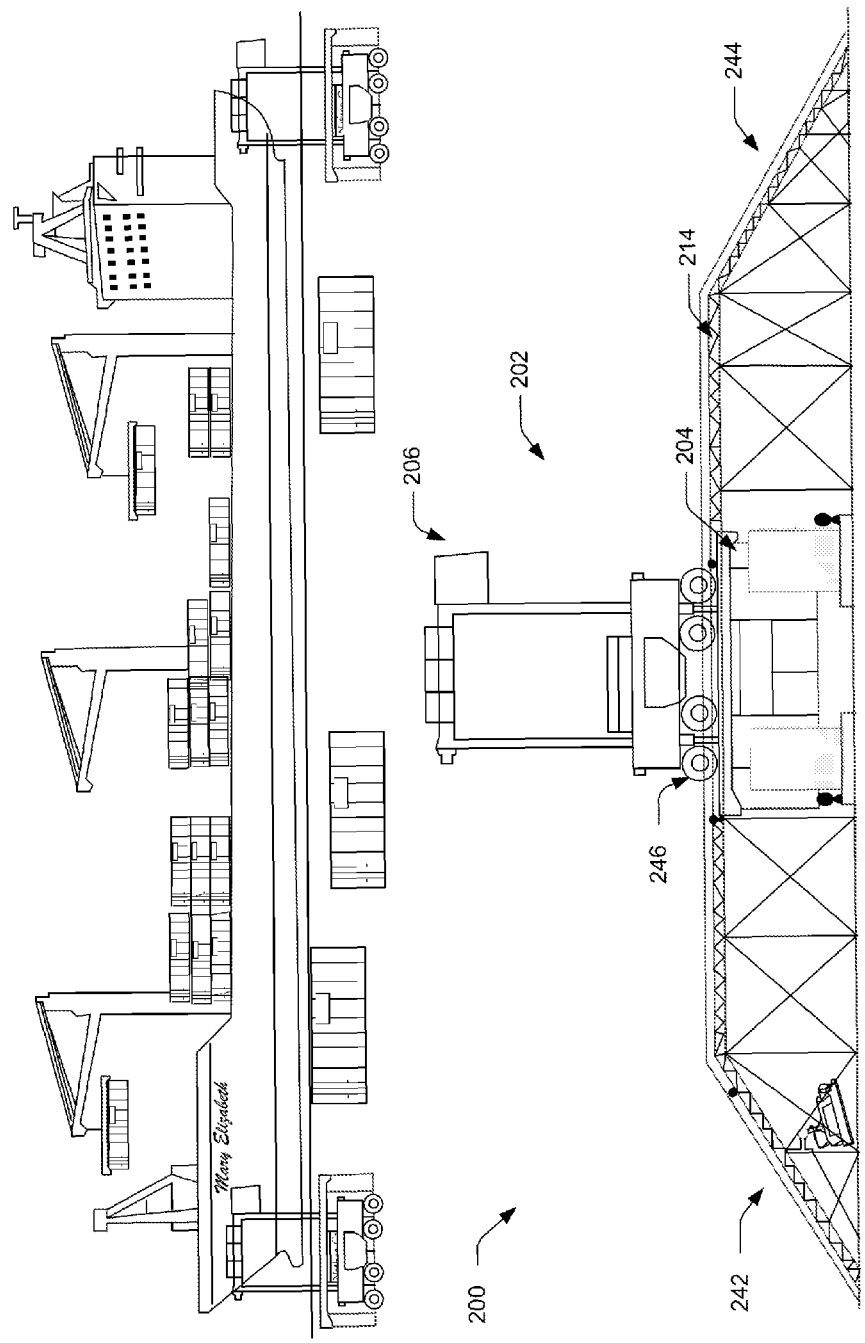
FIG. 2 is an illustration of an alternative embodiment of a system in accordance with the present disclosure. As illustrated, the system is generally on or above a surface of the surrounding area (relative to the caption "FIG. 2").

Referring to FIG. 2, another embodiment of a system 202 in accordance with the present disclosure is now described. Those of skill in the art will appreciate that the disclosure and teaching discussed in regard to FIG. 1 can be applied to the system, techniques, approaches, components, methods disclosed in conjunction with the system 202 and vice versa. For the purposes of illustration only, the system includes shielding and switches as described or similar to those disclosed in conjunction with FIG. 1. As illustrated, the system 202 includes a pair of tracks 214 that are arched. Like that of system 102, the tracks are spaced apart so that an intermodal container 204 and any support arms 218 on a straddle carrier 206 can pass between the tracks so it can position the container in position to be scanned by one or more scanners (e.g., a RPM and NII) on an opposite side of the tracks on which the straddle carrier is to drive.

Lateral braces 240 and/or interconnections can be included to prevent lateral motion of the tracks relative to the track's primary length. The foregoing may be done in a variety of ways, so it does not interfere with passage of an intermodal container between the tracks.

In the illustrated embodiment, the tracks are shaped with sloping approaches 242 and exit portions 244. The slope of the portions may be determined based on a variety of factors or criteria. These include, straddle carrier operating parameters (traction, engine capability), energy efficiency, weather conditions (anticipated or historical), scanner parameters, and so forth. For example, the slope is designed so wheels 246 on a straddle carrier 206 maintain sufficient traction. In other embodiments, the slope is selected based on a rate at which a straddle carrier 206 can raise/lower an attached intermodal container. The height of the tracks adjacent to the scanner in embodiments is approximately 8 (eight) feet high from a support surface of the tracks to an adjacent support surface. The height can be based on criteria, such as the height of an intermodal container and so forth. In embodiments, the length of the tracks are between eighty (80) to one hundred twenty (120) feet in length.

The system 202 may be useful in a variety of situations including but not limited to, instances where portability is desired (temporary or re-use at different locations), locations where the water table is high (e.g., swampy areas), or the like. Those of skill in the art will appreciate that the system 202 can be designed to permit efficient assembly/disassembly. For example the tracks may be formed of interconnecting sections that lock together, but permits efficient transport, e.g., truck transport such as on a semitrailer.

Figure 3:
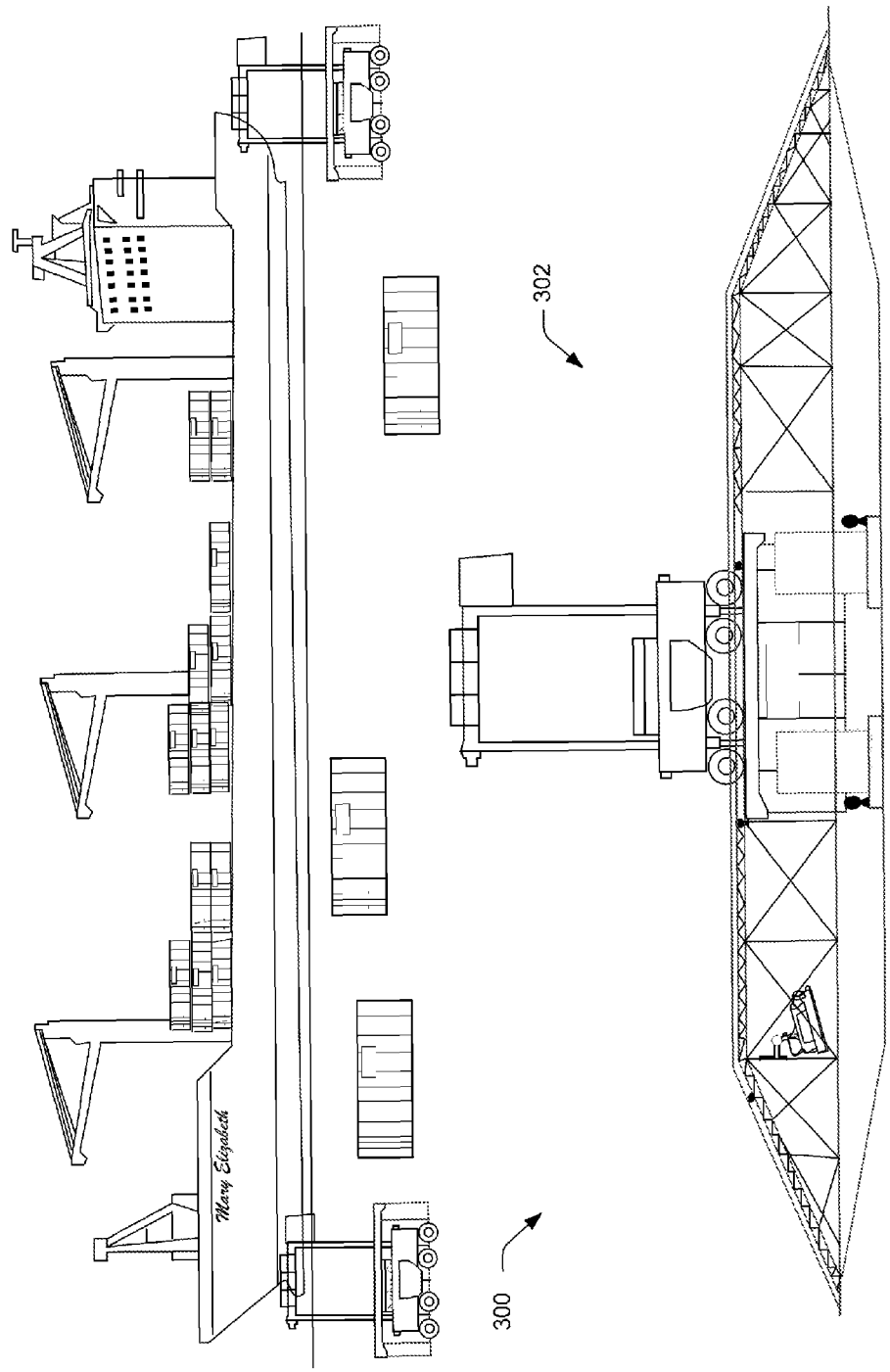
FIG. 3 is an illustration of another embodiment of a system in accordance with the present disclosure.

Turning now to FIG. 3, this is an illustration of a hybrid system 302. The system 302 too can implement the teachings, disclosures, components, devices, mechanisms, techniques, and approaches discussed in conjunction with that of FIGS. 1 and 2 and vice versa.

The system 302 implements a pit that is similar to that described in conjunction with FIG. 1 and may use arched or configured as trestle tracks similar to that described in conjunction with that of FIG. 2. Those of skill in the art will appreciate that the dimensions and/or configuration of the pit and/or tracks can be modified based on the system's hybrid design. An example of the foregoing is that the slope/height may be minimized in comparison to that of FIG. 2 and/or the pit's depth is minimized (e.g., 4 (four) feet deep).

It is to be appreciated that the system can be controlled using a computing system such as a computer programmed with instructions that permits it to perform the described tasks and functions described above and the methods that will be further described below. In embodiments, where a computing system is used, the instructions can be provided on computer storage media. Those of skill in the art will appreciate that the various electromechanical components of the system can be communicatively interconnected in a variety of ways including, but not limited to, physical wiring/communication links, wirelessly, and combinations thereof. Example wireless communications include BLUETOOTH (Bluetooth Sig, Inc., Redmond, Wash.) and wireless communication via 802.11 standard/group of standards (IEEE, New York, N.Y.).

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner. For example, a computer programmed with appropriate instructions functions as a controller that controls/receives the output of the various system components. These include but are not limited to the switches, scanners, detectors, cameras, communication systems (whether physically connected or wireless) and the like.

Having considered example operating environment and systems, consider now further discussion of example devices, systems, operations, and data flows that provide a framework in accordance with one or more embodiments. The example devices, techniques, approaches, methods, and systems may be used in conjunction with the environment, systems, devices, techniques, and so on described above. It should also be appreciated that while the method can be used with the system and vice versa the method is not restricted to the disclosed system and vice versa.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Having described systems, components, devices and mechanisms, additional approaches, techniques, and methods will be described. Those of skill in the art will appreciate that the approaches, techniques, and methods described below can be used in conjunction with one another.

Figure 4:
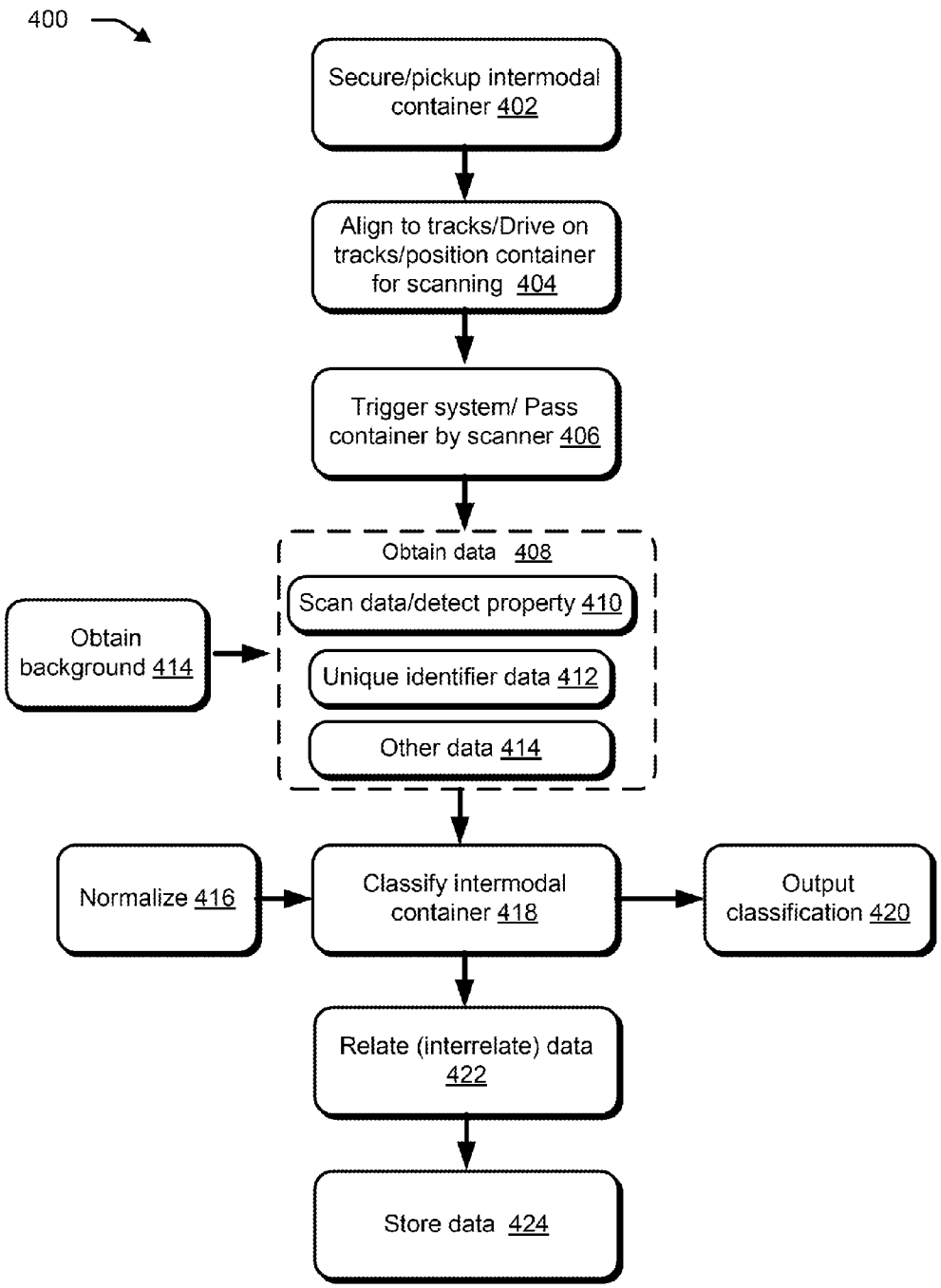
FIG. 4 is a flow chart illustrating a method in accordance with the present disclosure.

FIG. 4 is a flow diagram 400 that illustrates steps in a process for scanning an intermodal container. In embodiments, intermodal container scanning can be effectuated without disconnecting an intermodal container from a straddle carrier. This is to say that the intermodal container can be scanned while it is connected to a straddle carrier. While the flow diagram indicates a particular set of steps, those of skill in the art will appreciate that the steps may be rearranged, some of the steps omitted, and/or steps performed at the same time or approximately/substantially the same time while remaining within the scope/spirit of this disclosure. Although some blocks/steps are denominated as "optional," there is to be no negative implication from this label, e.g., blocks not carrying this marking are not mandatory. The flow chart merely provides a series of steps that may be performed and are only illustrative.

Initially, a straddle carrier may secure an intermodal container by using its hoist mechanism to engage twist locks that interconnect with corresponding lock blocks on the intermodal container (Block 402). This permits the straddle carrier to pick up the container using its hoist mechanism.

With the intermodal container secured, the intermodal container can align to the tracks and drive on. For example, aligns to the tracks so it can drive on. In instances where the straddle carrier is out of alignment a straddle carrier's wheel contacts a curb which directs it long the track (Block 404). The straddle carrier can then drive on the tracks and position the container for scanning (Block 404), e.g., lower the container into the scanner's path.

The system is triggered (Block 406). For example, one or more switches are positioned to trigger the system, and the scanners, into operation. An example of the foregoing is the use of a pressure or beam type switch when the straddle carrier's wheel makes contact or breaks a beam.

Responsive to triggering (Block 406), the system obtains data (Block 408). Obtaining data (Block 408) can include scanning the container to detect a property (Block 410), obtaining data for a unique identifier associated with the container (Block 412), or obtaining other data (Block 414), or combinations thereof. Examples of obtaining other data include, but are not limited to obtaining an image of at least a portion of the intermodal container, obtaining an image of a seal, obtaining data from an RFID tag associated with the container or used as a seal, and so on.

Optionally, a background is obtained (Block 414). This may be done before the system obtains data and may be used in normalizing the data (e.g., the obtained data) prior to or as part of using the scan data to classify whether or not the intermodal container meets a predetermined criterion, e.g., has a sufficiently high radiation level to reject the container or warrant additional inspection. For example, periodically scanners included in the system obtain background radiation (i.e., naturally occurring radioisotopes in the surrounding soil and building materials) scans so it is factored in to a determination whether the container meets or exceeds a predetermined threshold. In embodiments, the predetermined threshold is dynamically calculated based on a variety of factors, including but not limited to contents of the container, background radiation, e.g., some goods may naturally have higher radiation levels than that of other goods.

As discussed above, optionally obtained data may be normalized (Block 416). For example, an obtained radiation scan data is normalized using background radiation data to remove the influence of environmental (background) radiation, which may be due to solar activity, environmental radiation in the soil and surrounding building materials, etc.

The intermodal container is classified based on the scan data (Block 418). For example, a determination is made whether the intermodal container's property meets that of a predetermined criteria. An example predetermined criteria include, but are not limited to, a radiation level, a density, a shape, and so on associated with contraband or other item of interest. For example, a shape as determined by a NII scanner matches that of a prohibited weapon.

The result of the classification is output (Block 420). For example, a visual signal is provided to an operator of the straddle carrier letting him/her know where to place the container based on the classification. For example, if the container has a higher radiation level than that which is specified by the criterion, the instructions may be to place the container in an area used for secondary (intrusive) inspection. In contrast, if the container has passed, the output may be communicated to place the container in position for loading on a ship, semi-truck or for transport via rail.

Block 422 is representative of relating (e.g., interrelating) obtained data to one another and/or storing the data (Block 424). For example, scan data, unique identifier data, other data, background radiation data can be interrelated in a database (e.g., a relational database) and/or some of the information is provided as meta data to the other data. Additional information generated from the scanning can be included as well. Examples included, but are not limited to system operating parameters, time of day, vehicle data (ship, train information), port data, operator data, weather data, combinations thereof, and/or other data relevant to the container, its transport, or conditions related to operation of the system.

CONCLUSION

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not be taken as limiting or restricting the systems, techniques, approaches, methods, devices to those appearing in any particular section. Rather, as will be appreciated by one of skill in the art, the teachings and disclosures herein can be combined, rearranged, with other portions of this disclosure and the knowledge of one of ordinary skill in the art. It is the intention of this disclosure to encompass and include such variation.

What is claimed:

1. A method of screening an intermodal container comprising:
    passing an intermodal container relative to a scanner, with at least a substantial portion to be scanned of the intermodal container substantially lower than an underside of at least one wheel of a straddle carrier, to detect a property associated with the intermodal container; and
    classifying the intermodal container according to a predetermined criteria based on the property.

2. The method of claim 1, wherein the predetermined criteria comprises a radiation level or a physical property associated with contraband.

3. The method of claim 2, wherein contraband comprises at least one of narcotics, drugs, explosives, illegal weapons, an illegal good, or a combination thereof.

4. The method of claim 1, further comprising:
    obtaining data that represents a unique identifier physically associated with the intermodal container; and
    relating the unique identifier data with data, generated by the scanner, that represents the property.

5. The method of claim 4, wherein the unique identifier comprises a visible identifier observable on an outer surface of the intermodal container, a barcode on an outer surface of the intermodal container, or a radio frequency identification (RFID) tag physically connected to the intermodal container.

6. The method of claim 4, wherein obtaining data includes obtaining data from a Convention for Safe Containers (CSC) plate affixed to the intermodal container or a Bureau International des Containers (BIC) code on the intermodal container.

7. The method of claim 1, wherein the property comprises a property associated with an item contained in the intermodal container at detection.

8. The method of claim 4, wherein passing is performed without disconnecting the intermodal container from the straddle carrier.

9. The method of claim 1, further comprising:
    checking a seal on a latch used to secure a door of the intermodal container; and
    relating the data obtained from checking the seal with data, generated by the scanner, that represents the property.

10. The method of claim 9, wherein the data obtained from checking the seal comprises an image of the seal or an image of an area where a seal is to be located on the intermodal container or data obtained from a radio frequency identification (RFID) tag seal for the latch.

11. The method of claim 1, further comprising normalizing data that defines the property by adjusting the data for the property with data for a background in order to determine the property for comparison with the predetermined criteria.

12. A method of screening an intermodal container comprising:
obtaining radiation or x-ray scan data from an intermodal container, wherein at least a substantial portion to be scanned of the intermodal container is positioned substantially lower than an underside of at least one wheel of a straddle carrier;
responsive to a determination that the obtained data meets a predetermined criteria, generating a notification that directs the straddle carrier to a particular location; and
storing data from the determination with the obtained data in a record with data for a unique identifier associated with the intermodal container.

13. The method of claim 12, wherein obtaining is performed by moving the intermodal container or a scanner relative to the other.

14. The method of claim 12, further comprising communicating the notification wirelessly to the straddle carrier or to a visual indicator communicatively coupled to a system performing the method.

15. The method of claim 12, wherein the unique identifier comprises a visible identifier observable on an outer surface of the intermodal container, a barcode on an outer surface of the intermodal container, or a radio frequency identification (RFID) tag physically connected to the intermodal container.

16. The method of claim 13, wherein data for a unique identifier comprises data from a Convention for Safe Containers (CSC) plate affixed to the intermodal container or a Bureau International des Containers (BIC) code on the intermodal container.

17. The method of claim 12, wherein the obtained data comprises radiation or x-ray scan data associated with an item contained in the intermodal container when the data is obtained.

18. The method of claim 12, wherein obtaining is performed without disconnecting the intermodal container from the straddle carrier.

19. The method of claim 12, further comprising:
checking a seal on a latch used to secure a door of the intermodal container; and
relating the data from checking the seal with the obtained data.

20. The method of claim 19, wherein the check data comprises an image of the seal or an image of an area where a seal is to be located on the intermodal container.

21. The method of claim 12, further comprising normalizing obtained data by adjusting the obtained data based on data for a background in order to determine whether the predetermined criteria is met.

22. A system for scanning an intermodal container while connected to a straddle carrier comprising:
a pair of tracks, the individual tracks being of sufficient width to permit a wheel included on the straddle carrier to pass on the track, the individual tracks being spaced apart from the other individual a sufficient distance to permit at least a substantial portion to be scanned of an intermodal carrier to be lowered by the straddle carrier deployed on the tracks substantially below the pair of tracks; and
a scanner positioned on a side of the pair of tracks opposite a side configured to support the straddle carrier, the scanner being configured to detect the presence of radioactive material or contraband.

23. The system of claim 22, wherein contraband comprises at least one of an explosive, narcotics, drugs, an illegal good, or an illegal weapon.

24. The system of claim 22, further comprising shielding material disposed adjacent the scanner, the shielding material having a radiation blocking capability.

25. The system of claim 22, further comprising a presence detection mechanism configured to detect the presence of the intermodal container positioned between the individual tracks and being on the opposite side.

26. The system of claim 25, wherein the presence detection mechanism comprises at least one of:
a pressure switch, positioned to be triggered by a tire included on the straddle carrier, and operable to initiate the scanner to scan the intermodal container;
a camera, configured to identify that the intermodal container is in a position to be scanned by the scanner, operable to initiate the scanner to scan the intermodal container;
a light beam detector, positioned to be triggered by the straddle carrier or the intermodal container, operable to initiate the scanner to scan the intermodal container; or
an radio frequency identification (RFID) detector, operable to initiate the scanner to scan the intermodal container responsive to receipt of data from an RFID tag connected to the intermodal container.

27. The system of claim 22, wherein the scanner is positioned below the pair of tracks.

28. The system of claim 22, wherein the scanner comprises a radiation detector or an x-ray scanner.

29. The system of claim 28, wherein the system include both the radiation detector and the x-ray scanner.

30. The system of claim 29, wherein the system including the radiation detector and x-ray scanner are configured to blink so only one of the radiation detector or x-ray scanner is operating at a particular time.

31. The system of claim 22, wherein the track includes a least one curb that is configured to align the straddle carrier on the track by physically contacting a side of a tire on the straddle carrier to align it relative to the pair of tracks.

32. The system of claim 22, wherein the system further comprises a sump configured to collect water if the scanner is at least partially below ground.

33. The system of claim 22, wherein the pair of tracks are arched toward the side configured to support the straddle carrier.

34. The system of claim 22, wherein the pair of tracks are substantially flat and even with a level of an area adjoining the pair of tracks.

35. The system of claim 22, wherein the detector is substantially above a level of an area adjoining the pair of tracks.

* * * * *